United States Patent [19]

Josephson

[11] Patent Number: 4,974,878
[45] Date of Patent: Dec. 4, 1990

[54] FINANCIAL DATA PROCESSING SYSTEM USING PAYMENT COUPONS

[75] Inventor: Stanley M. Josephson, Dallas, Tex.

[73] Assignee: Remittance Technology Corporation, Irvine, Calif.

[21] Appl. No.: 262,833

[22] Filed: Oct. 26, 1988

Related U.S. Application Data

[63] Continuation-in-part of Ser. No. 183,776, Apr. 20, 1988, abandoned.

[51] Int. Cl.⁵ ............................................. B42D 15/00
[52] U.S. Cl. ..................................... 283/67; 283/58; 283/70
[58] Field of Search .............................. 283/58, 67, 70

[56] References Cited

U.S. PATENT DOCUMENTS

| | | | |
|---|---|---|---|
| 1,284,264 | 11/1918 | Dunfee | 283/38 |
| 3,672,703 | 6/1972 | Jay | 282/25 |
| 4,346,442 | 8/1982 | Musmanno | 283/58 X |
| 4,405,157 | 9/1983 | Bennett | 283/58 |
| 4,433,436 | 2/1984 | Carnes | 283/58 X |
| 4,637,634 | 1/1987 | Troy et al. | 283/98 |

FOREIGN PATENT DOCUMENTS

8502148  5/1985  World Int. Prop. O.

OTHER PUBLICATIONS

Check #1443 to First American Bank.

Primary Examiner—Paul A. Bell
Attorney, Agent, or Firm—Lyon & Lyon

[57] ABSTRACT

There are disclosed herein methods and systems for affecting the accounting functions of debiting and crediting a bank's accound records, a payor's bank account records and a corporations's accounts receivable or balance forward records with their customer's payments, and are based on the ability of a payment coupon with appropriate payor's authorization and necessary pre-printed machine readable data to create a variety of multi-function transactions. By combining all of the required data elements in a single payment coupon document at either the time of preparation or at the time of receipt of the payment coupon by the corporation, the requirement for subsequent redundant, labor intensive processes are eliminated. The single payment coupon becomes a multi-functional document which generates the transaction to effect the customer's accounts receivable or balance forward, the negotiable instrument to (1) credit the corporation's bank account and (2) debit the customer's bank account while creating a complete audit trail and accountability at each separate processing level.

9 Claims, 8 Drawing Sheets

*fig. 1a.*    FRONT SIDE

| Payment No. 30 | Account No. 35 | Reference Number 77 | Due Date 40 | Payment Amount 45 |

Customer Name 10
Customer Address
Customer City, State, ZIP    Bank Account Number 20    After this Date    Pay this Amount 50

Payee Name 15
P. O. Box 12345    Bank Transit/Routing No. 25

City, State, ZIP

If you wish to pay by Electronic Funds Transfer indicate by checking box. □ 55

Your Signature Below Authorizes us to charge
Your Bank Account 61

Signature — not valid unless signed by account owner. 60

⑆5110⋯0481⑈ ⑉000 198 56⋯ 7⑈ 63

BE SURE TO RECORD ALL PREAUTHORIZED PAYMENTS
Payment No.    Payment Date
Reference No.

*fig. 1b.*    BACK SIDE

Prior Address ——— 64 ——— New Address

Prior Bank             New Bank

FIG. 2a. (FRONT SIDE)

Draft

Bank Name
Bank Address
Bank City, State, ZIP — 65 — Bank Transit/Routing No. — 90
XX-XXXX / XXXX Pay to the order of: Payee Name — 70
P. O. Box 12345
City, State, ZIP — Reference No. — 77

Payment Amount — 85

Application of this Payment — 97
Principal
Interest
Balance
Y-T-D Interest

Customer Name — 75
Customer Address
Customer City, State, ZIP — 90

Bank Account Number — 80 — 96
Account Number — 95

95 — This payment has been authorized by your depositor

⑈111000012⑈ 00 0547 0⑊   "000000000"— 85

FIG. 2b. (BACK SIDE)

For Deposit Only
to the Account of
Payee — 98
account no.
Bank Name — 99
Bank Address
Bank City, State, ZIP
Transit/Routing Number

COUPON GENERATION PROCESS fig. 4 CONVENTIONAL REMITTANCE PROCESSING

NEW FORM OF REMITTANCE PROCESSING

CHECK AND DRAFT PROCESSING FUNCTIONS

NON-PAID DRAFT PROCESSING

STOP PAYMENT AND
CUSTOMER-BANK CONTROL
FILE MAINTENANCE

FINANCIAL DATA PROCESSING SYSTEM USING PAYMENT COUPONS

This application is a continuation-in-part of application Ser. No. 183,776 filed Apr. 20, 1988, now abandoned.

BACKGROUND OF THE INVENTION

This invention relates to bill paying processes and systems. More specifically, it relates to financial data processing systems and, in particular, to payment receipt and acceptance systems which utilize a coupon document in combination with a customer initiated negotiable instrument, such as a bank check, for accomplishing the application of funds to an installment type of account receivable or balance forward record.

Typically, installment paying processes are accomplished through a variety of manual procedures and automated systems; however, all incorporate a similar characteristic; namely, the preparation and mailing of a package of periodic payment coupons designed to be returned by mail or directly presented by the payor with an accompanying payment usually in the form of a bank check.

Upon receipt by the payee or alternately, a lockbox at a depository bank, of the incoming remittance envelope, the contents are examined, sorted, and, if certain acceptance criteria are met, the two documents (coupon and check) are compared by manual or automated means, and appropriate data is extracted and records are generated. One record is used to debit and credit funds to the payee's and payor's balance forward or accounts receivable. An additional record prepares the bank check for deposit at the payee's financial institution for processing the check through the check clearing network for application to the payor's account at a financial institution and ultimately returned as a cancelled check to the payor with the monthly checking account statement to allow the payor to reconcile the checking account and be used as proof of payment, if needed. The check clearing process requires the amount of the check to be encoded with a machine readable code by manual or automated means by the depository financial institution preparatory to the clearing process.

The above method of processing is widely used for routine household bill paying for a variety of products and services. Typical uses are mortgage and installment loan payments, consumer finance payments, home improvement loans, lease rentals and insurance premium payments. The public has accepted this method of processing and it has become routine procedure in most households.

These processing systems, however, have certain disadvantages. For example, the labor intensive, manual processes that must be performed in combining the two types of documents (coupon and check) that are necessary to properly create the application records generate many problems (called "exceptions"). Some of the problems involve a check without an accompanying coupon, a coupon without an accompanying check, incorrect payee, stale-dated or postdated check, incorrect payment amount, multiple documents of either type, restrictive notations, unidentified payee, cash payments and third party checks. Each of these exceptions requires manual decisions, special handling, and costly labor intensive processes. Even without these problems, the proper combining of the two documents results in duplicate, redundant processing steps such as microfilming, control total generation, reconciling steps, and dual audit trails. Consequently, this method of processing is expensive, time consuming and error prone.

Corporations that perform this type of processing absorb the highest portion of these costs and have been experimenting with alternative methods such as electronic remittance processing. The Automated Clearing House (ACH) process is one type of electronic payment system. Typically, the customer initiates a request to the corporation to electronically charge the customer's checking account for the exact payment on a predetermined date each payment period. Electronic transfers are made at that time, crediting the customer's payee's accounts receivable or balance forward and debiting the customer's checking account at the appropriate financial institution. While this process is quite automated, consumer acceptance has been minimal and it has not been successful on a national scale. As a result, the volumes are low and corporations must be equipped to process in both the electronic and the more expensive paper based modes which in turn result in overall higher costs. Customers, in general, have not accepted the electronic method of payment because they recognize that they do not control the timing of the payment, have no receipt and are unfamiliar with procedures to initiate stop payments, to change financial institutions, or to discontinue the service.

Household bill paying procedures in certain European countries utilize a single document process called a "GIRO". It is essentially a bill or invoice which includes a return portion to effect a funds transfer. The payor authorizes payment by signing the return stub and indicating the payment amount, and returning that portion to the issuer or to a central processing service. Funds are transferred upon receipt of the document. The accounts receivable is credited, and the payor's depository funds are debited.

In the GIRO method, the return portion is not a negotiable instrument and does not provide the payor nor the payee the legal protection afforded under the Uniform Commercial Code. The major differences between the check clearing process and the Federal Reserve System in the United States as compared to those in a European country do not allow a GIRO system to operate efficiently within the United States. This coupled with the "central bank" concept in Europe versus the large number of United States commercial banks, savings banks, savings and loan associations and credit unions (over 16,000) which provide Demand Deposit Accounts preclude the use of the GIRO process in this country.

An alternative bill paying method was introduced in the early 1970s called "Bill Check." This method allowed the authorization of an accounts receivable payment by the payor signing the return bill stub, indicating the amount to be paid and returning the stub to the billing agency or payee. Funds transfer documents were manually prepared which would credit the accounts receivable, debit the payor's checking account and credit the payee's account at the depository financial institution.

This method was not popular with the consumer and was not economically justified by the payee because of its costly manual functions and high incidence of error conditions. This method was never adopted for the payment coupon method of installment payment.

Additionally, since the documents generated did not meet the Uniform Commercial Code with respect to negotiability, issues concerning stop payment and other types of return items were not solved.

An automated system which would incorporate the essential elements of the current two documents used in conventional coupon payment systems into a single document thereby reducing the time, the labor, the documents processed, the correction procedures needed to resolve errors, and the resultant expenses of such processing is and has been desirable. Moreover, such an automated system that would preserve the characteristics of the standard payment coupon would provide the consumer and bank with an unquestionable high level of acceptance and widespread use, as well as significant economic gains and would expedite the availability of funds for the using corporation.

GLOSSARY OF TERMS

The following terms are used herein for clarity and convenience.

AUTOMATED CLEARINGHOUSE (ACH)

A computer-based clearing and settlement operation, often operated by a Federal Reserve Bank, established for exchange of electronic transactions among participating depository institutions. Such electronic transactions can be substituted for paper checks used to make recurring payments such as payroll or pre authorized insurance premiums.

CHECK CLEARING

The movement of checks or drafts from the banks or other depository institutions where they are deposited back to those on which they are written, and funds movement in the opposite direction. This process results in credits to accounts at the institutions of deposit and corresponding debits to the accounts at the paying institutions. The Federal Reserve participates in check clearing through its nationwide facilities, though many checks are cleared by private sector arrangements.

ELECTRONIC FUNDS TRANSFER SYSTEM (EFTS)

A variety of systems and technologies for transferring funds (money) electronically rather than by check. Includes such systems as Fedwire, Bankwire, Automated Clearing House (ACH), Electronic Data Interchange (EDI) and other automated systems.

DEMAND DEPOSIT

A deposit payable on demand, or a time deposit with a maturity period or required notice period of less than 14 days, on which the depository institution does not reserve the right to require at least 14 days written notice of intended withdrawal. Commonly takes the form of a checking account.

FINANCIAL INSTITUTION

An institution that uses its fund chiefly to purchase financial assets (deposits, loans, securities) as opposed to tangible property.

DEPOSITORY INSTITUTIONS

Financial institutions that obtain funds mainly by accepting deposits from the public, these include commercial banks, savings and loan associations, mutual savings banks and credit unions.

CHECK

A written order directing a financial institution to pay funds as instructed; also referred to as negotiable instrument or bank check.

DRAFT

A written order for the payment of funds by one person or bank to another.

COUPON

A pre-printed document usually prepared in book form and containing certain information related to a periodic payment obligation. Usually used for mortgage, installment, consumer loan payments.

PAYEE

The company or financial institution to which a check document is payable, also referred to as the corporation, issuer or billing entry.

PAYOR

The individual that negotiates the check document or draft, also referred to as the customer or consumer or payer.

DEPOSITORY BANK

The first bank to which a check is transferred even though it may also be the paying bank or the payee.

DRAWEE BANK

The bank on which the check document or draft is drawn.

MACHINE READABLE FONTS

A variety of printed fonts, symbols or characters used by certain electronic equipment to automatically read and interpret the printed information. Fonts may include magnetic ink character recognition (MICR), optical character recognition (OCR), and Bar Code.

LOCKBOX

A U.S. Post Office box number or address established by the payee or the bank or data processing servicer, to which all like remittance incoming mail is sent and accumulated for pick-up.

AUTOMATED TELLER MACHINES (ATM's)

Computer controlled terminals located on the premises of financial institutions or elsewhere, through which customers may make deposits, withdrawals, or other transactions as they would through a teller.

CASH LETTER

A bundle of one or more checks accompanied by a list of the individual checks and dollar amounts. Checks are usually presented by one bank to the Federal Reserve Bank or another bank via a cash letter much as an individual or corporation deposits checks and provides a deposit ticket to a bank.

PRE AUTHORIZED DRAFT

A transaction wherein the payer authorizes the payee to draw a check against the payer's bank account. Hence, the initiation of the transaction is by the payee rather than the payer.

SUMMARY OF THE INVENTION

The foregoing description of the conventional two document process (payment coupon and bank check) and other related difficulties of that remittance processing method are solved by this invention which includes:

(1) a novel payment coupon document with a unique format(s), machine readable fonts and capable of changes in function as it passes through the remittance processing steps.

(2) a new method covering the entire remittance processing cycle from initial payment coupon preparation, receipt of payment coupons, initial data extraction, data processing, data merging and printing through to completion of the payment steps.

This method incorporates the use of high speed printers, like the Xerox 9700 laser printer, which are capable of producing standard machine readable fonts, such as Optical Character Recognition (OCR) and Bar Codes or optionally Magnetic Ink Character Recognition (MICR) fonts in conjunction with suitable computer programs to produce a variable formatted set of payment coupons. The payment coupons are printed in sets of similar payment amounts for each customer. The number of coupons is determined by the number of periodic installments needed to repay a loan obligation or the term of a lease obligation or, in the case of a mortgage loan, a set of coupons for an annual monthly payment period. The contents of the payment coupon includes all required information in machine readable form to automatically generate transactions to effect funds transfers that credit the payor's accounts receivable balance or balance forward, debit the payor's bank account and credit the payee's account at the depository bank. Consequently, the present invention eliminates the requirement of the remittance processing function to organize, compare, handle, control and process at least two separate documents.

The present system and method provides the flexibility, through data base design and program logic, to produce a variety of styles, fonts, quantities, formats and data elements to tailor the payment coupon to specific customized requirements.

As the payment coupons are produced, they may be organized in booklet form including front and back covers, change of address forms, change of bank forms, return envelopes, instructions, and return mail labels. They are then prepared for mailing to the corporation's (payee) customers (payors). Prior to each payment due date, the payor extracts a payment coupon from the booklet, signs the authorization, thereby creating a payment coupon that will subsequently automatically effect the appropriate funds transfer functions. The payor may choose to have the transaction processed through electronic funds transfer (ACH) means and will indicate this selection on the face of the coupon. The payment coupon is placed in an envelope for return mail. A payor's bank check is not included.

Upon receipt of the mail at the corporation or at their depository bank (i.e. "lockbox") through the postal system, the envelopes are opened and the enclosed payment coupons are segregated and prepared for entry through a reading or scanning device that has the ability to read and validate the specific machine readable font selected by the payee. The primary machine readable data contained on the payment coupon is the payment amount and the payor's account number. Additional information, if contained on the payment coupon, can be read such as the payor's bank account number and the payor's bank transit/routing number. This data is combined with other data files through computer program interfaces to extract data to generate a funds transfer transaction, either in the form of a preauthorized draft or an electronic funds transfer (ACH) origination, and to generate a file of payment data to be used by the payee's accounts receivable system or loan accounting system to automatically update each customer's record with the payment data.

If the payor selects the preauthorized draft option, drafts are printed using a page printer, like the Xerox 9700 laser printer, with MICR machine readable fonts in a format conforming with industry standards (American Bankers Association publication 147R3 - "The Common Machine Language"). This allows the draft to pass through all financial institution's processes that are performed in the various stages of the check clearing process. In addition to the required information printed in MICR font, additional information is printed comprising payor's name and address, payor's bank name and address, payor's account number, payment amount, payee's name and address and, optionally, information regarding the application of the payment. For example, principal, interest, balance forward, year-to-date interest, taxes paid, etc. The payee's selected depository bank's standard endorsement can also be printed on the back of the check at the time the draft is printed.

If the payor selects the electronic funds transfer option (ACH), an origination record is generated in the standard ACH format for subsequent transmission and entry into the funds transfer network. This allows the electronic transaction to pass through all financial institution's processes to effect the proper funds transfer functions. In addition to the required ACH data transmitted comprising payor's name, payee's name, payor's bank name and address and transit/routing number, payor's bank account number, payment date, payment amount, reference or trace number, optionally, supplemental or addendum records may be generated and passed through the funds transfer network. These additional records supply information regarding the application of the payment for example, principal balance, interest paid, balance outstanding, year-to-date interest paid and taxes paid. Dependent on the type of data processing systems employed by the payor's bank, the additional information may be printed on the payor's bank statement or on a separate form that may be included as an enclosure in the bank statement.

Through other aspects of the process, the same system accommodates many ancillary processes, such as automated stop payment, automated return draft handling, and automated notification of paid in full loans. This system, which incorporates data that has historically required two separate, unique documents, into a single, multipurpose document, provides all of the functionality of the conventional system, but in a highly efficient, economical manner.

Savings are realized by the major reduction in personnel costs through the reduction of half of the incoming document volume (elimination of the check), to the associated reduction of labor intensive operations (comparison of the payment coupon to the check and encoding the amount paid on the check), elimination of equipment, file storage, floor space and administrative overhead. Through this process, it is expected that other remittance costs will be reduced through elimination of customer inquiries, more timely updating of accounts receivable or balance forward records, lower bank clearing charges, expediting funds availability and reduced postage costs. The labor reductions are outlined below and illustrate a savings of about 50 percent over conventional processing methods.

CONVENTIONAL REMITTANCE PROCESSING

Management (5%): Supervision, administration, reporting, customer services.

Mail Function (5%): Collect, mail sorting, opening.

Inspection (10%): Review, examine, segregate, batch, log.

Remittance Processing (45%): Document reading/scanning, check encoding, endorse, capture, microfilm.

Control (15%): Balance, verify, adjust, reconcile, correct, prepare deposit, data preparation, data transmission.

Exception Processing (20%): Nonnegotiable checks, irregular amounts, unreadable, unprocessable, stop payments, restrictive checks, returns, correspondence.

NEW METHOD OF REMITTANCE PROCESSING

Management (5%): Supervision, administration, reporting, customer service.

Mail Functions (5%): Collect, mail sorting, mail opening.

Inspection (5%): Review, examine, segregate.

Remittance Processing (22%): Coupon reading/scanning, capture, microfilm.

Control (8%): Balance, verify, adjust, data preparation, data transmission.

Exception Processing (5%): Correspondence, stop payments, returns.

Conversion from present methods of conventional processing to the new method is quickly and efficiently accommodated. Several different procedures may be used:

(1) customers may be notified through direct mail that they may take advantage of the new method by notifying the payee of their bank account number and the name of their bank and signing a blanket preauthorization form, (2) the payee may obtain the bank account number and name of their bank by extracting that data from the payor's most recent payment, (3) all new accounts may be required to utilize the new method at the time of loan origination.

Regardless of the method, the proper data may be generated to allow complete use of the new method without a lengthy conversion and start-up period.

Accordingly, it is a principal objective of the presentent invention to provide an improved payment coupon remittance process and system.

Another objective of this invention is to provide a new form of payment coupon which contains an authorization to charge the payor's bank account for the amount due the payee.

A further objective of this invention is to automatically create a preauthorized draft document or electronic funds transfer record containing all required information to enter the check clearing mechanism or the electronic funds transfer (ACH) network.

Another objective of this invention is to include pertinent information relative to the application of the payment on the preauthorized draft or electronic funds transfer (ACH) addendum records for subsequent return to the payor through the normal bank account statement.

These and other objectives and features of the present invention will become better understood through a consideration of the following description in conjunction with the drawings.

BRIEF DESCRIPTION OF DRAWINGS

FIG. 1a shows the face (front side); one form of a payment coupon according to the present invention. FIG. 1b shows the reverse (back side) of the payment coupon.

FIGS. 2a and 2b show one form of the PreAuthorized Draft document according to the present invention.

DETAILED DESCRIPTION

Figure 3:
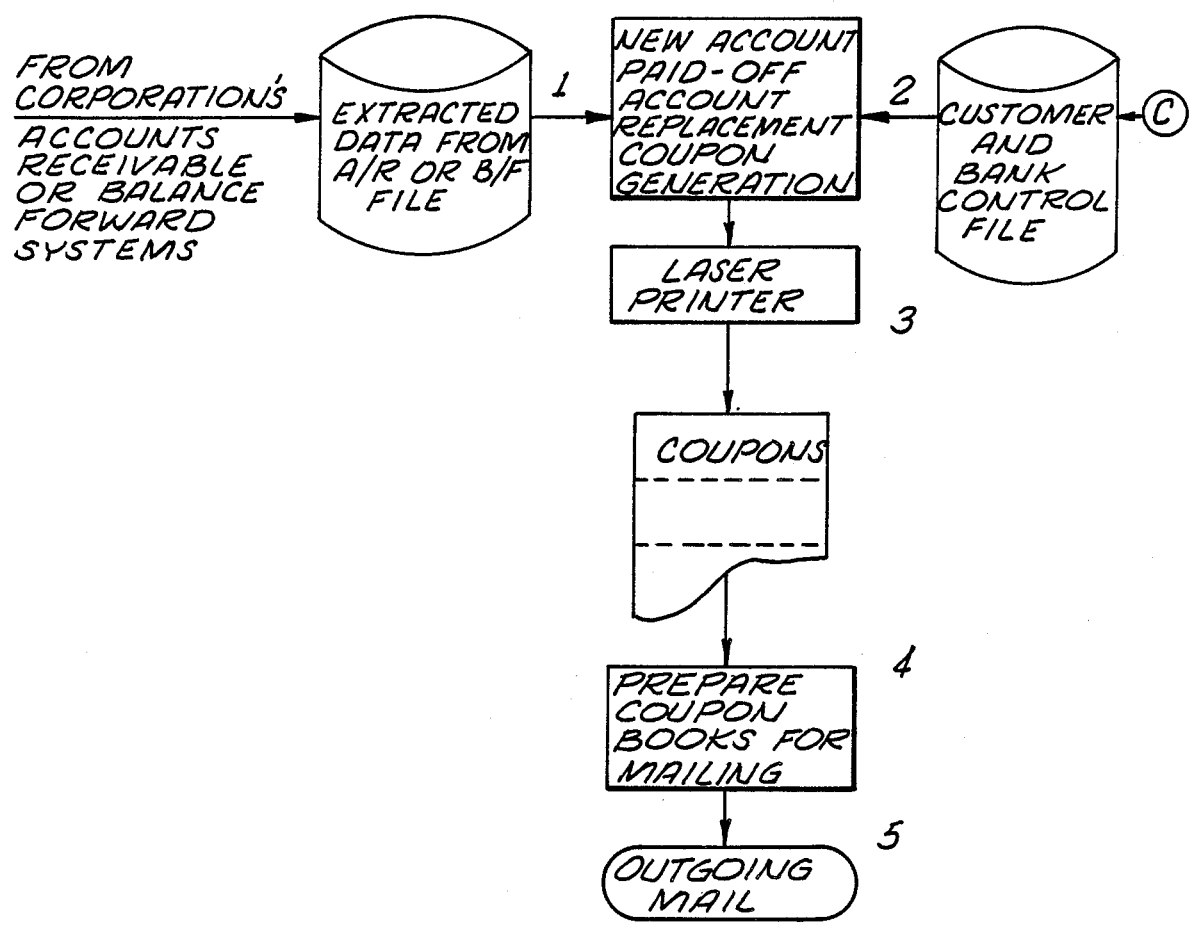
FIG. 3 is a flow chart illustrating how the printing and mailing of payment coupons is performed according to the present invention.

Turning now to a detailed description of the concepts of the present invention, and exemplary embodiments of the method, system and documents involved, the payment coupon will first be described. The payment coupon as shown in FIG. 1a contains all of the standard information commonly printed on typical payment coupons plus additional information consistent with the requirements of the present invention. This information includes the full name and address of the customer (payor) 10, the full name of the payee, address or post office box number, city, state and Zip code 15, the payor's bank account number 20, the payor's bank transit/routing number 25, the payment or installment number 30, the payor's account number or loan number with the payee 35, the payment due date 40, the payment amount due 45, the late charge amount or payment amount including the late fee 50, an authorization statement 55, an authorization signature space 60, an electronic funds transfer selection indicator 61.

According to the present invention, machine readable information in the form of either OCR, Bar Code or MICR or any combination is printed on the face of the payment coupon. Depending on the optional selection made by the payee, the machine readable data may typically consist of payment amount, payment amount plus late charge, account number, bank account number, bank transit/routing number, and reference number 63.

The reverse side of the payment coupon shown in FIG. 1b shows an area set aside for the payor to indicate changes to either the payor's address, payor's bank or payor's bank account number 64.

The preauthorized draft document shown in FIG. 2a contains all of the standard information usually printed on preauthorized drafts and includes; the drawee bank name, address, city and state 65, the payee's name, address or post office box number, city, state and zip 70, the payor's name, address, city, state and zip code 75, the reference number 77, the payor's account number with the payee 80, the amount paid in both numeric form and machine readable (MICR) font 85, the drawer bank's transit/routing number in both numeric form and machine readable (MICR) font 90, the payor's bank account number in machine readable (MICR) font 95.

An authorization statement 96 is also printed on the face of the document to notify the payor's bank of the payor's authorization. An area is set aside for customized data as may be required by the payee. It may contain data such as the application of the last payment in terms of principal, interest, remaining balance, year-to-date interest 97.

The payee's standard endorsement can be printed on the reverse side of the preauthorized draft document as shown in FIG. 2b. The information, composed of a payee's depository bank account name and account number data 98 and variable endorsement data 99 are selected and retrieved from a file which contains the endorsement information for one or more of the depository banks selected by the payee.

A detailed description of the processing methods and systems embodied in the present invention are described in FIGS. 3 through 8. (The identification numbers in each Figure correspond to the paragraph numbers below.)

Initial new loan or new account coupons, replacement coupons and coupons requiring payment and/or payor bank or payor address changes are prepared as shown in FIG. 3. Depending on the term of the loan, frequency of payment or other criteria, the number of similar payor coupons to be produced will vary from 1 to 60. For example, a mortgage loan payment coupon book is usually produced annually; therefore, 12 monthly coupons are prepared. An installment loan for an automobile loan may be a five year term; therefore, 60 coupons are produced. The variable number of coupons per payor is dependent on information contained in a file extracted from the accounts receivable or balance forward system maintained by the payee.

Other information needed to produce the coupons (FIG. 1) is retrieved from certain data bases as more fully described in the section describing the computer software systems.

FIG. 3—Coupon Generation Process

1. Receive extracted data from the Corporation's (payee's) accounts receivable or balance forward system
2. Computer processing to interface, match, update and extract required data from the previously updated customer and bank control file data base
3. Print payment coupons, depending on the format and corporation control file selections. The reverse side of each coupon may be printed with an area set aside for name, address, or bank changes.
4. Prepare coupons in booklet form to include front and back covers, address and bank change inserts and other types of information as deemed appropriate by the Corporation.
5. Mail coupon books to customers (payors) which may include return envelopes, either preaddressed or window type.

Figure 4:
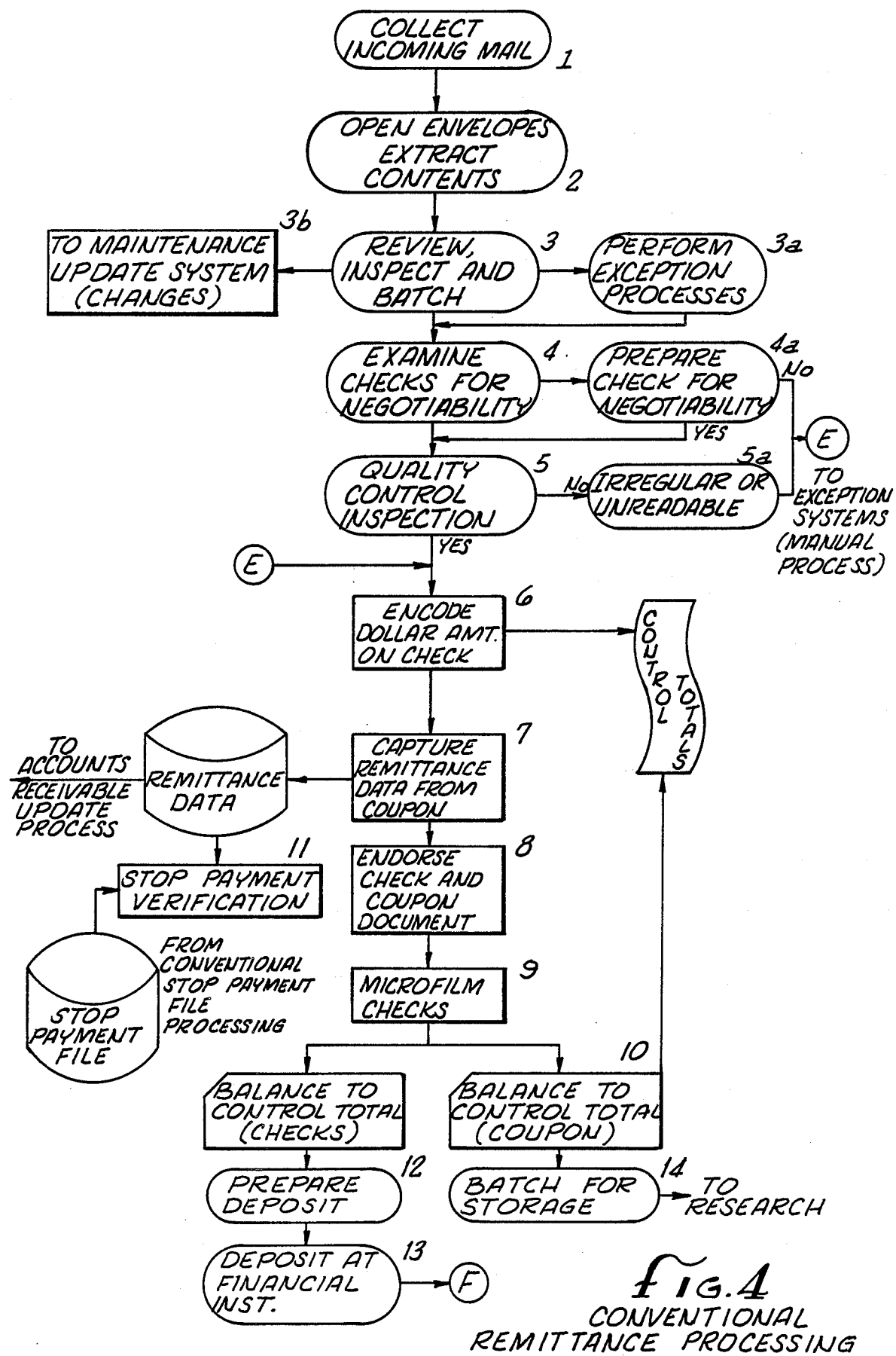
FIG. 4 is a flow chart illustrating a typical set of the detailed processing steps required for returned ("incoming") payment coupons and accompanying checks as presently conducted in conventional remittance processing systems.

FIG. 4—Conventional Remittance Processing System

FIG. 4 is a flow chart illustrating the steps performed in using conventional processing systems for incoming remittances (with identification numbers corresponding to the paragraph numbers below).

1. Collect mail from post office boxes.
2. Open envelopes and extract contents.
3. Review and inspect contents to determine which remittances (coupons and checks) are processable and which are unprocessable. Batch coupons and checks in control groups.
3a. Perform exception processing procedures for unprocessable remittances to include:
   a. Coupon without accompanying check
   b. Check without accompanying coupon
   c. Multiple checks, single coupon
   d. Multiple coupons, single check
   e. Cash payment
   f. Non-matching amount between check and coupon.
3b. Segregate and direct customer correspondence and requested changes to clerical procedures.
4. Examine checks for negotiability and acceptability to include:
   a. Missing or incorrect payee
   b. Missing date, post dated or stale dated check
   c. Written and numeric amount different
   d. Foreign checks
   e. Missing signature
   f. Third party checks
   g. Restrictive notations on check.
4a. Perform exception processing procedures for non-negotiable checks.
5. Verify the amount remitted on the check to amount written on coupon and other quality control procedures.
5a. Perform exception processes for unreadable, i.e., mutilated coupons.
6. Encode check with dollar amount in magnetic ink (MICR) and establish control totals.
7. Read and capture payment coupon data for transmission and subsequent updating of accounts receivable files and/or balance forward files.
8. Endorse the coupon with audit trail information and endorse the check with standard endorsement.
9. Microfilm checks.
10. Balance coupons to control totals.
11. Perform stop payment verification processes.
12. Prepare deposit documents.
13. Deliver deposit to the appropriate depository bank.
14. Batch coupons for storage and for subsequent research and customer inquiry purposes.

Figure 5:
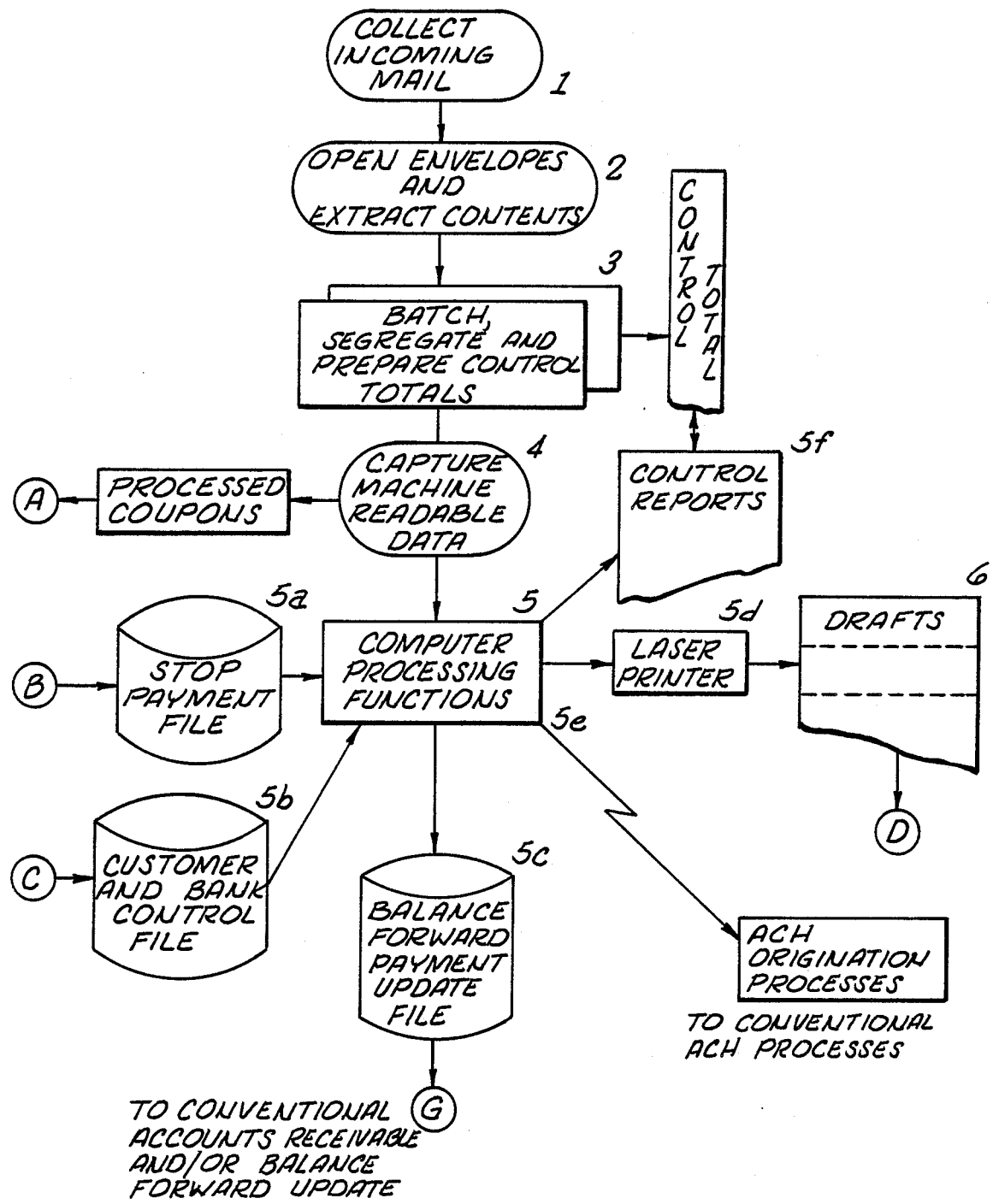
FIG. 5 is a flow chart illustrating the detailed processing steps for returned ("incoming") payment coupons in accordance with the present invention and, in comparison with FIG. 4, shows the efficiencies, labor reduction and associated cost reductions available by practicing the concepts of the present invention.

FIG. 5—New Form of Remittance Processing

FIG. 5 is a flow chart which details the steps for incoming payment coupons according to the new method of the present invention, and particularly illustrates the significant simplification available through the practice of the present invention in comparison to the conventional processing steps required in FIG. 4 (the numerals correspond to the paragraph numbers below).

1. Collect mail from post office boxes.
2. Open envelope and extract contents.

3. Batch coupons in control groups by type of payment option selected (preauthorized draft or ACH) and prepare control totals for each group.
4. Read and capture machine readable data from payment coupon.
5. Perform computer processing functions which include:
   5a. Matching coupon data with stop payment file to detect any restricted payments.
   5b. Matching coupon data with customer and bank control file data to extract information to be printed on the preauthorized drafts or information to be transmitted via electronic funds transfer.
   5c. Extracting payment information for preparation of a file to update the payee's accounts receivable and/or balance forward data base.
   5d. Reformatting payment information for release to a laser printer for subsequent printing of preauthorized drafts.
   5e. Selection and generation of the electronic funds transfer origination record of payment coupon's requesting electronic funds transfer (ACH) processing rather than preauthorized draft processing.
   5f. Prepare control report for balancing purposes.
6. Print preauthorized drafts as previously described in FIGS. 2a and 2b.
7. Prepare a transmit file containing data to initiate standard electronic funds transfer (ACH) origination record.

Figure 6:
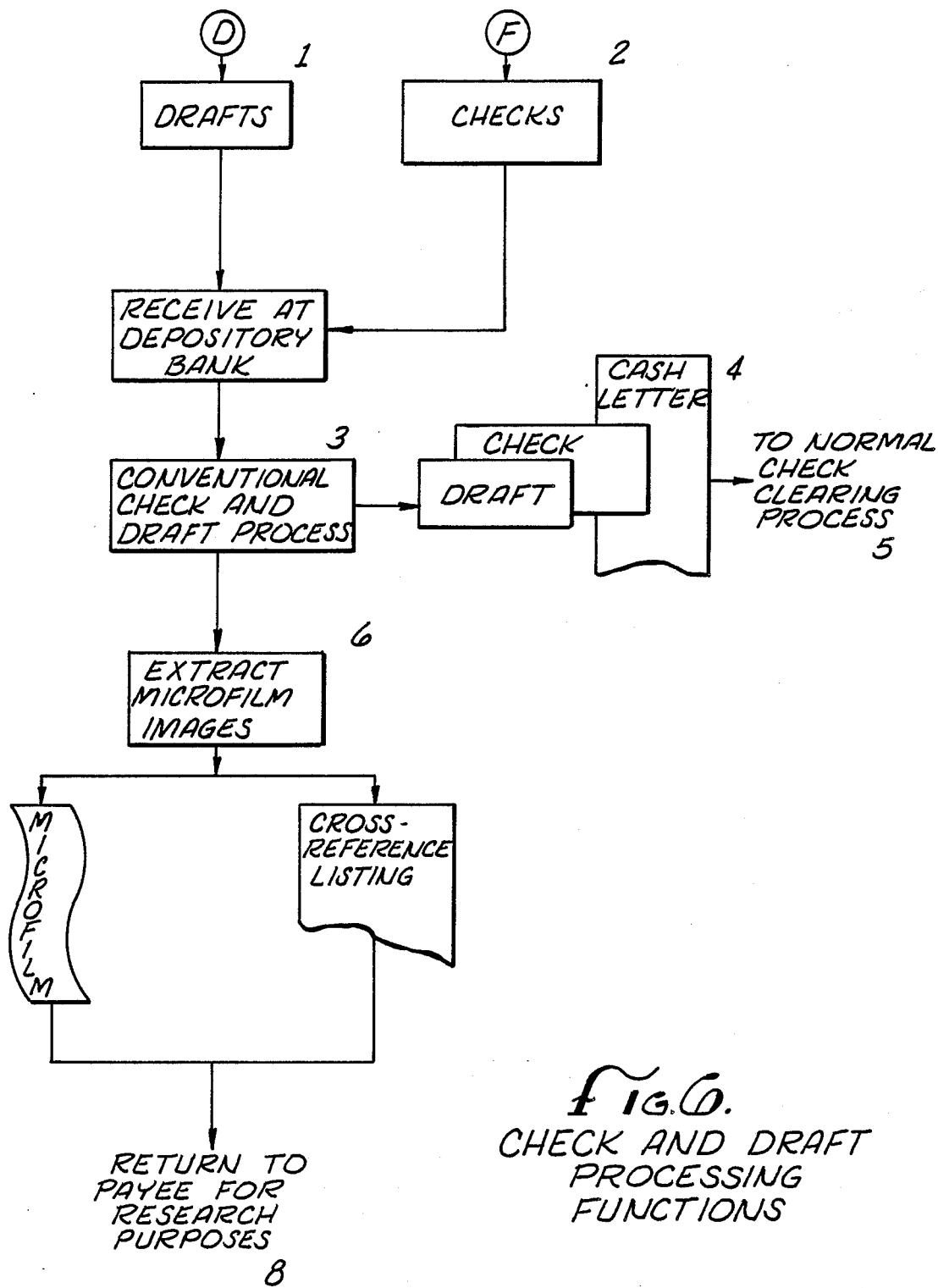
FIG. 6 is a flow chart illustrating the details of a typical check or draft processing function.

FIG. 6—Check and Draft Processing Functions

FIG. 6 illustrates the processing steps performed by typical depository banks in regard to processing checks and preauthorized drafts (identification numbers correspond to the paragraph numbers below).
1. Preauthorized drafts with accompanying deposit slip are received at the depository bank.
2. Checks with accompanying deposit slip (from conventional remittance processing systems) are received at the depository bank.
3. Conventional check and preauthorized draft processes which include: Validate, microfilm, endorse, capture, pocket deposited checks and drafts, correct and re-enter rejected checks and preauthorized drafts and reconcile checks and drafts to amounts on deposite slips.
4. Prepare cash letters (bank to bank deposits) to clearing financial institutions or Federal Reserve Banks.
5. Dispatch chevcks and preauthorized drafts with accompanying cash letters (bank to bank deposits) to appropriate clearing financial institutions and Federal Reserve Banks.
6. Extract and develop microfilm images of checks and preauthorized drafts.
7. Prepare cross reference listing of checks and preauthorized drafts in account number and/or amount sequence.
8. Return cross-reference list and microfilm to payee for research purposes.

Figure 7:
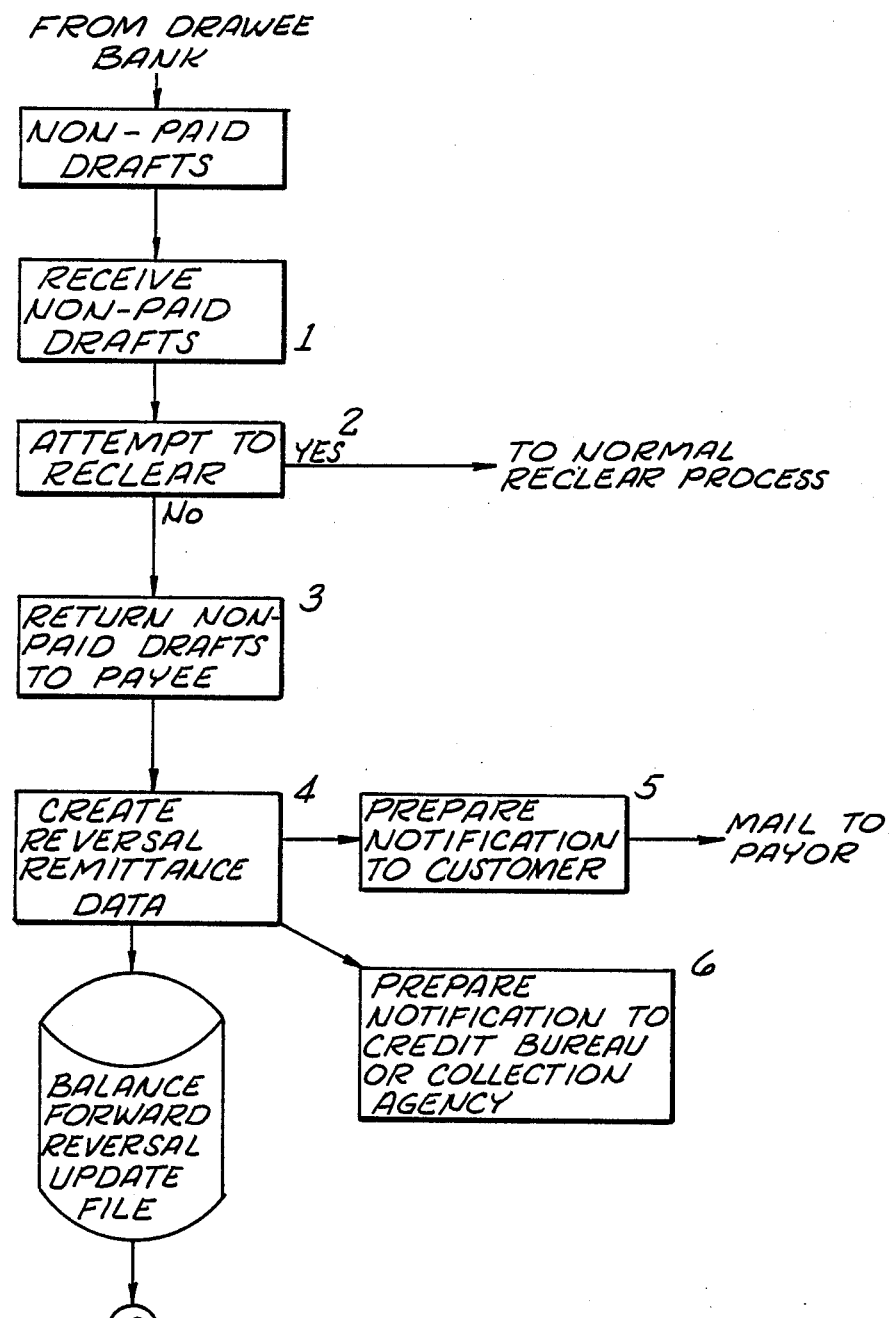
FIG. 7 is a flow chart illustrating the details of the non-paid draft processing functions.

FIG. 7—Non-paid Draft Processing

FIG. 7 illustrates the non-paid draft processing procedure according to the present invention (identification numbers correspond to the paragraph numbers below).
1. Receive non-paid drafts (non-sufficient funds, closed account, etc.) from payor's bank (Depository bank functon).
2. Attempt to redeposit and reclear non-paid drafts (Depository bank function).
3. Return non-paid drafts (after second reclear process) to payee (Depository bank function).
4. Using the original preauthorized draft to automatically create a reversal transaction that generates a file for subsequent accounts receivable and/or balance forward update processing.
5. Prepare a notification letter of non-paid draft to payor.
6. Prepare optional notification to credit bureau and collection departments.

Figure 8:
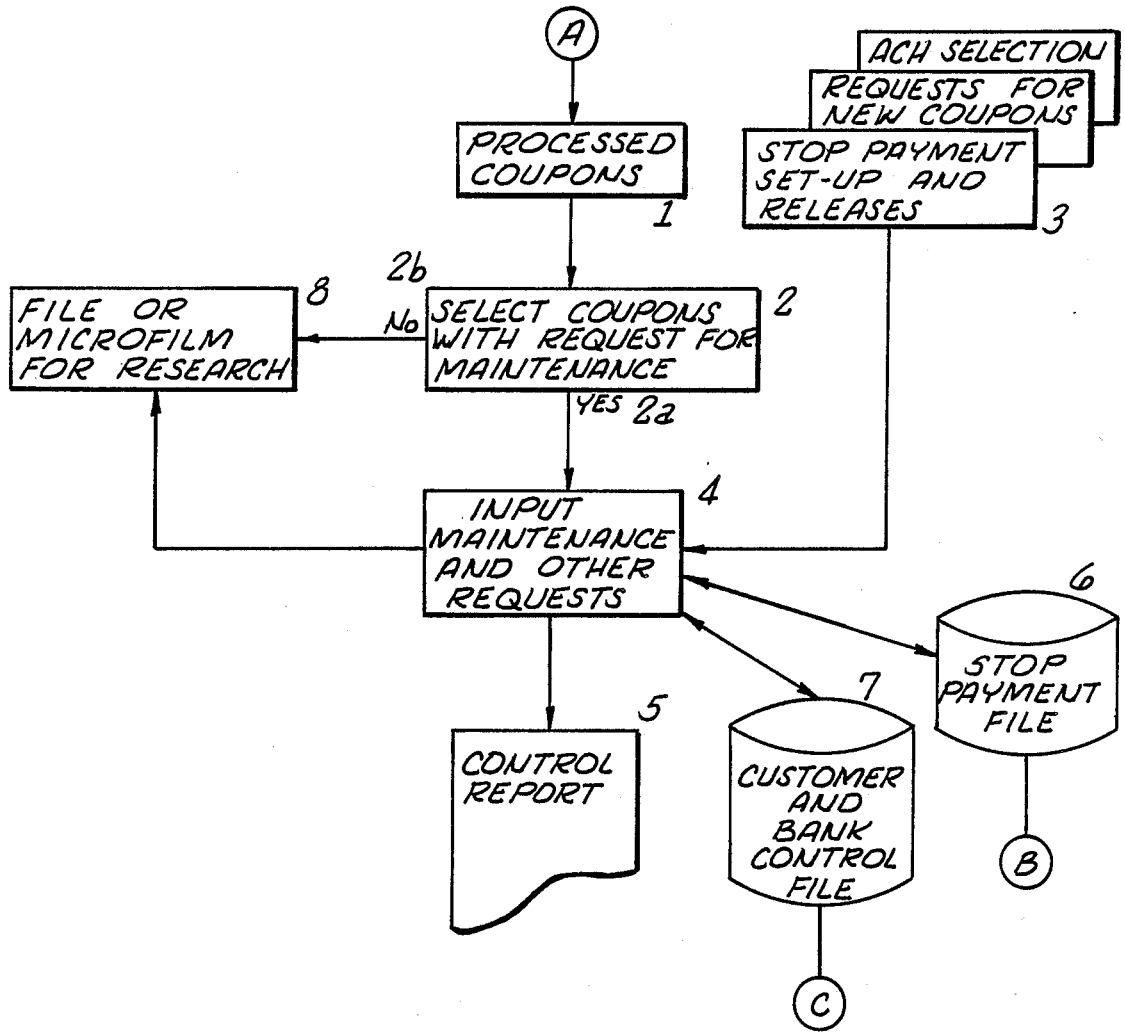
FIG. 8 is a flow chart illustrating control file generation and maintenance processing functions and stop payment setup and release maintenance functions.

FIG. 8—Stop Payment and Customer Bank Control File Maintenance

FIG. 8 illustrates the method of performing maintenance (add, change, delete) to the stop payment file and the customer and bank control file (identification numbers correspond to the paragraph numbers below).
1. Processed coupons from FIG. 5 step 4 are received.
2. Coupons are segregated as follows:
   2a. Coupons with customer requested maintenance changes such as name and address changes, bank account number changes, bank name changes.
   2b. Coupons without any customer requested changes.
3. Various types of payee or customer initiated changes are received such as stop payment setup and stop payment releases, requests for new or replacement coupons and Electronic Funds Transfer instructions (ACH).
4. Create computer terminal input for maintenance and other requests.
5. Produce a control report listing all accepted and nonaccepted data.
6. Update existing stop payment file with applicable data.
7. Update existing customer and bank control file with applicable data.
8. File or microfilm processed coupons for research purposes.

As will be readily apparent to those skilled in the art, implementation of various aspects of the present method and systems preferably is accomplished through thge use of conventional data processing equipment and suitable computer software programs. The foregoing description of the payment coupon, as well as the various steps involved in creating and processing the payment coupon and the subsequent generalization of the preauthorized draft document will make it apparent to those skilled in the art how to design and develop the suitable computer programs, there being numerous modifications and variations which will be required because of the particular requirements of the payees involved. Even so, set forth below is a further discussion of the software for accomplishing the methods of the present invention. The software is designed to be generic in that it has the facility to function in a standard manner, but utilized customized options and parameters that will tailor the standard software for specific requirements desired by the using payee.

There are three primary computer software systems; (1) Customer and Bank Control File Generation and Update, (2) Coupon Generation Subsystem, and (3) Preauthorized Draft Generation System. The detailed description of each of these subsystems is as follows:

CUSTOMER AND BANK CONTROL FILE GENERATION SUBSYSTEM

This system includes the functions of generation of the initial customer and bank control file data base for preexisting source data and from the extraction of other data base sources and the periodic update and maintenance of this data base. The contents of the file include such elements as:

| Fixed Data Base Elements | Sources |
| --- | --- |
| Customer Name and Address | Accounts Receivable File |
| Bank Name and Address | Bank Name Data Base |
| Account Number (Bank) | Source Data |
| Bank Transit/Routing Number | Bank Name Data Base |
| Account Number or Loan Number | Account Receivable File |
| Payee Name | Payee Control File |
| Payee Address or Post Office Box Number | Payee Control File |
| Coupon Format Options | Payee Control File |
| Preauthorized Draft Format Options | Payee Control File |
| Variable Message Options | Payee Control File |
| Endorsement Data | Payee and Endorsement Control File |

| Variable Data Base Elements | |
| --- | --- |
| Current Payment Amount | Accounts Receivable File |
| Prior Payment Amount | Accounts Receivable File |
| Payment Number | Accounts Receivable File |
| Delinquent or Past Due Code | Accounts Receivable File |
| Late Charge Due | Accounts Receivable File |
| Late Charge Amount | Accounts Receivable File |
| Billing Period Code | Accounts Receivable File |
| Billing Cycle Code | Accounts Receivable File |
| Electronic Funds Option Code (ACH) | Source Data |
| Variable Data Option | Source Data |
| Variable Data | Accounts Receivable File |
| Last Payment Data | Accounts Receivable File |

Certain data elements within the file may be updated through on-line interaction maintenance transactions that may add, delete or change certain data elements within the customer and bank control file (FIG. 8).

The primary key to accessing the customer and bank control file is the customer account number. However, other keys may be used to access the file such as bank transit/routing number and bank account number, customer name, customer partial name, customer address, and last payment date or certain combinations of the above.

During the maintenance of the customer and bank control file, an additional data base is maintained—the stop payment file. Maintenance activity such as stop payment adds, deletes or changes updates this file from source data supplied by the payee. The data elements are:

| Fixed Data Base Elements | Source |
| --- | --- |
| Account Number or Loan Number | Payee Source Data |
| Date of Stop Initiation | Payee Source Data |
| Date of Last Change | Payee Source Data |
| Reason for Stop Payment | Payee Source Data |
| Stop Payment Code | Payee Source Data |
| Customer Name and Address | Payee Source Data |

As updates are performed, listings are prepared detailing the specifics of each transaction. The file is also used to produce activity reports, statistical data, management reports and usage statistics. The integrity of both files are maintained by the generation of internal record counts and other types of control totals. Access to the file for maintenance purposes is controlled by multilevel security codes which prevent unauthorized use.

COUPON GENERATION SUBSYSTEM (FIG. 3)

The primary purpose of this subsystem is to produce individual coupons for new accounts and for replacement couponds required for payment changes, term changes, lost coupons, etc. Data from the Corporation's (payees) accounts receivable or balance forward file is matched against data from the previously described customer and bank control file. Records are generated when certain conditions are encountered such as new accounts, requests for new coupons, payment changes etc. The data is also reformatted according to certain payee options, sequences and styling as determined by payee coupon format option code.

These formatted records are then released to a laser printer, such as a Xerox 9700, which uses standard software to produce the payment coupons (FIGS. 1a and 1b) in the desirable format and in the quantities required. Control totals are prepared to insure that all selected records have been produced. A facility for restarting the printing process at any point is available in the event that the printing operation is interrupted.

PREAUTHORIZED DRAFT GENERATION SYSTEM (FIG. 5)

The primary purpose of this subsystem is (1) read the data previously captured from the payment coupons, (2) read the previously updated stop payment data, (3) read the previously updated customer and bank control file data, (4) general control totals reports, (5) produce formatted records for subsequent printing of preauthorized drafts, (6) produce formatted records for subsequent accounts receivable or balance forward update processes, and (7) generate formatted ACH records for release to conventional ACH processes.

This process is accomplished by the matching of the incoming files on the basis of an account number. The account number of the incoming payment coupon record is matched to the stop payment file to determine if the payment is to be stopped, i.e., not processed. If a match occurs, the payment coupond data is extracted for subsequent printing of stop payment matches. If no match occurs, processing continues. The payment coupon data is matched to the appropriate record on the customer and bank control file. Certain data from that file is extracted for preauthorized draft printing; customer name and address, bank name and address, bank account number, payment amount and variable data. Other information is extracted from the payment coupon data such as payment number and reference number. This data is then reformatted for either printing preauthorized drafts under the control of standard software systems available for laser printer operations, or for preparation of an electronic funds transfer file (ACH) with similar contents for release to conventional ACH origination processes. Data required for preparation of a file to update the payee's balance forward or accounts receivable system is extracted during the matching process. Control totals and detail listing of certain contents of the matched records are printed for balancing and reconciling purposes.

Preauthorzied drafts are printed utilizing the extracted data as previously described. The formatted drafts (FIGS. 2a and 2b) are printed in the designated sequence for subsequent delivery to the appropriate depository bank.

SUMMARY OF STEPS

A. The system and method of the present invention can be characterized as one which involves the creation and use of a payment coupon which contains an authorization statement and other printed and encoded data contained thereon pertaining to the payee, payor, the amount of payment, the payor's bank accound number, payor's bank name and address, and a reference number. Certain of the printed data is also printed in machine readable fonts. An area for the payor to notify the payee of address changes and bank account number changes is set aside on the reverse side of the payment coupon.

B. In generating the intitial set of the payment coupons, two sources of data are combined. The first is information from a data base which contains certain information such as the payor's name and address, payor's bank account number, bank name and address, loan or billing account number and other appropriate identification. The second source of information includes variable information from the payee's accounts receivable or balance forward accounting system.

C. The payment coupons (FIGS. 1a and 1b) are created from the foregoing information (FIG. 3). The number of coupons to be prepared for each payor is variable and dependent on the term of the loan or the frequency of payment required. The payment coupons are generated by a high speed laser printer (FIG. 3), and include the appropriate MICR codes and/or OCR and/or bar codes on the front of the coupon. These machine readable codes and the associated data represented may include such information as account number, bank transit/routing number, bank account number, payment amount, payment number, and reference number.

D. The payor (customer) receives a group of payment coupons in book form. At each payment due date period, the payor removes the payment coupon from the book, signs the authorization and mails the payment coupon in a supplied return envelope. Typically, the return envelope has a transparent window such that the return address preprinted on the payment coupon may be read to expedite postal delivery to the designated address. The payor does not have to fill in any other information, nor does the payor have to include a conventional bank check.

E. After mailing, the payment coupon is received at a designated location typically, referred to as a "lockbox", which is at a predetermined location.

F. After extracting the payment coupons from the envelope, the machine readable data is read and processed by various types of reader/sorter equipment such as a CESTRP700. The machine readable data is extracted and sent to a computer system that performs the data processing function previously described (FIG. 5).

G. As shown in FIG. 5, preauthorized drafts or optionally Electronic Funds Transfer (ACH) data is generated. These drafts are prepared in a format that is suitable for automatic entry into normal bank depository processes and subsequent to that, to the normal check clearing process.

H. The system and process include other features such as the automatic processing of return items, stop payment, file or data base maintenance and the like, but the previously described steps comprise the main overall processing steps.

I. Thye system and processes include other features that provide internal control, security, management information and performance tracking.

FEATURES AND BENEFITS

The payment coupon previously described and the methods to utilize that document in remittance processing environments provide numerous features and benefits, particularly including those described below.

The payment coupon is created with the properties to completely identify all necessary elements to completely effect the application of payments to the payee's accounting process, to generate the appropriate transaction to completely effect the depository bank's accounting process and the drawee's bank accounting process in a manner that allows the transaction to be automatically processed by all financial institutions involved in the check clearing process, upon authorization by the payor. The necessary elements include, but are not limited to, the payor's account number, the payor's bank account number, the payment amount, the payor's bank transit/routing number, the payment number, and the reference number.

The system incorporates a combination of ingredients, including the payment coupon along with data bases, software, computer, document reading and document printing technologies described herein to effect a more efficient, timely, and accurate remittance process.

The payment coupon incorporates multiple machine readable fonts, optionally in OCR, Bar Code or MICR, in any combination that can be automatically read and processed by equipment such as CES 9400 Remittance Processing Equipment. The single payment coupon is used to generate multi-function automated transactions rather than multiple separate documents are used in conventional methods to effect the transfer of funds.

The payment coupon incorporates machine readable reference numbers that allows an audit trail to be established from the payor's records to the payment coupon through to the preauthorzied draft and ultimately back to the payor as a cancelled check.

The method of the present invention allows for multiple machine fonts such as, but not limited to, MICR, OCR and Bar Codes with appropriate check digits to insure the accuracy of information reading. For example, the payment coupon can be printed with redundant information in different fonts. The remittance processing equipment can read both at the same time and compare values to guarantee accuracy.

Of particular significance, the payment coupon of the present invention generates a fully qualified preauthorized draft which may enter the check clearing network without change, contain the same information as the original payment coupon, contain the payee's and the depository bank's endorsement on the reverse side of the preauthorized draft, contain information on the face of the preauthorized draft pertinent to the application of the payment or other useful information to be communicated from payee to payor, and as a record of payment.

While the foregoing represents the primary features and advantages of the present invention, there are various secondary features and benefits as set forth below.

The method provides the ability to access and retrieve the payor's accounts receivable account number from the customer and financial institution's data base automatically through the use of certain elements of machine readable data contained on the payment coupon. For example, if the payee chooses to provide the payor with a payment coupon without the machine readable accounts receivable account number, that number may be accessed and retrieved for accounts receivable or balance forward payment application by use of the combination of the payor's bank's transis/routing number and the payor's bank account number which provides a unique key for positive retrieval.

Optional settlement by various payment methods including, but not limited to, automated clearing house (ACH), automated teller machine (ATM), manned teller workstation, point of purchase automated checkout stations, and conventional billing practices are enabled. The customer and financial institution control file subsystem as described herein contains all the information required to make payment by any option upon authorization by the payor.

The method makes possible a series of collection time reporting and analysis systems which reflect the payor's relative payment return behavior unique to each, such as type of payment, area of country, customer type, payment size, time of month/year, services used, and depository financial institution. No similar capability exists with conventional systems. Without the complete information contained on and read from the payment coupon such data cannot be obtained.

Microfilm image retrieval is allowed based upon the capture sequence and the unique reference number on the preauthorized draft that is cross-referenced to the film image. For example, if a payee wishes to locate a specific payor's preauthorized draft film image for the purpose of payment verification, the microfilm preauthorized draft image can be retrieved by selecting a retrievel process which uses the reference number or bank account number or the dollar amount or the payor's bank transist/routing number. This capability cannot be accomplished under conventional processes.

At the time of printing, the payee can provide account information on the face of the preauthorized draft unique to each of their customers. For example, the preauthorized draft record may be printed with year-to-date interest paid, and, when the cancelled check is returned to the customer, it provides proof of payment for Internal Revenue Service purposes. This capability cannot be accomplished by conventional methods. Ultimately, important payor information which must now be tracked by alternative information mailed to the payor, may be incorporated into the cancelled check file enabling the payor to eliminate one piece of paper associated with record keeping.

Non-paid preauthorized drafts automatically create customer notification of nonpayment and notification to central credit bureaus. For example, letters can automatically be prepared and sent to the payor and collection agencies informing them of delinquency and other credit information.

The payee can communicate with individual segments of its customer base via use of the preauthorized draft based upon such customer or transaction characteristics as payor's bank, services used, level of service usage, geographic region of the country, known household or corporate customer characteristics, dollar amount of invoice or time of year. In fact, this method enables information to be provided as a permanent record on returned cancelled checks.

The present method adds security to the ultimate payment of funds to a single account for deposit at the depository bank for credit to the rightful payee, by printing the payee name on the front and the payee endorsement on the back of the preauthorized draft at the time of preparation. This approach uses duplex printers, such as the Xerox 9700, which prints on both sides of the preauthorized draft. Printing the depository financial institution's endorsement on the back of each unit record at the time of the preauthorized draft preparation, including the depository financial institution's standard nine digit routing nubmer in OCR or BAR code, allows the payor's bank to expedite a non-paid preauthorized draft to the depository bank through automated processes.

Last but not least, the present concepts provide a fully negotiable preauthorized draft that complies with all legal aspects of the Uniform Commercial Code. In particular, the payor has all rights with respect to return for stop payment.

The payor's bank has all rights with respect to return for uncollected funds, return for insufficient funds, and return for closed accounts.

While embodiments of the present invention have been shown and described, various modifications may be made without departing from the spirit and scope of the present invention, and all such modifications and equivalents are intended to be covered.

What is claimed is:

1. In a financial data processing system wherein a non-negotiable payment coupon enables automatic printing of a preauthorized draft that is capable of entering a conventional check clearing network, the preauthorized draft comprising a document which is printed upon receipt by the payee, a lockbox or a bank and based upon the machine readable data contained on a respective payment coupon, said draft including both human readable information and machine readable data, the human readable information on the draft comprising at least the name of the payee, the name of the payor, the payor's bank account number and the payor's account number with the payee, a reference number, name of the payor's bank, payment amount, information regarding the matter billed, the payment date, and the machine readable data on the draft comprising the payor's bank transit/routing number, the payor's bank account number, the payment amount, and the payor's account with the payee.

2. In a financial data processing system wherein a non-negotiable payment coupon enables automatic preparation of a preauthorized draft that is capable of entering a conventional check clearing network without further manual processes or enables an origination record to be generated without further manual processes for entry into an electronic funds transfer network comprising a payment coupon in the form of a document having printed thereon human readable information and machine readable data, the human readable information including at least the name and bank account number of a payor, the account number of the payor with a payee, a payment amount, an indication for enabling the payor to direct an electronic funds transfer, and an authorization statement signable by the payor to allow the draft to be prepared or the electronic funds transfer to occur upon receipt of the payment coupon by the payee, a lockbox or a bank to (i) debit the payor's bank account, (ii) credit the payee's account at the payee's depository bank, and (iii) credit the payment amount to the payor's accounts receivable or loan balance forward with the payee, and the machine readable data including the payor's account number with the payee.

3. A payment coupon as in claim 2 wherein the machine readable data further includes payment amount, payor's bank account number, payor's bank transit/routing number, and a reference number.

4. A system as in claim 3 wherein the human readable information and machine readable data printed on the draft includes a reference number.

5. A financial data processing system which a non-negotiable payment coupon enables upon receipt an origination record to be generated for entry into an electronic funds transfer network, comprising a payment coupon in the form of a document having printed thereon human readable information and machine readable data, the human readable information including at least the name and bank account number of a payor, the account number of the payor with a payee, a payment amount, an indication for enabling the payor to direct an electronic funds transfer, and an authorization statement signable by the payor to allow the draft to be prepared, or the electronic funds transfer to occur to (i) debit the payor's bank account, (ii) credit the payee's account at a payee depository bank, and (iii) credit the payment amount to the payor's accounts receivable or loan balance forward with the payee, and the machine readable data including at least the payor's account number with payee;

printing means for printing the payment coupon; and system means for receiving the payment coupon and reading therefrom sufficient machine readable data, to allow extraction of data from a data base for initiating the electronic funds transfer in response to retrieval of the machine readable data contained on the payment coupon.

6. In a financial data processing system wherein a payment coupon enables automatic preparation of a preauthorized draft that is capable of entering a conventional check clearing network, a payment coupon in the form of a non-negotiable document having printed thereon human readable information and machine readable data, the human readable information including at least the name and bank account number of a payor, the account number of the payor with a payee, a payment amount, an indication for enabling the payor to direct an electronic funds transfer, and an authorization statement signable by the payor to allow the draft to be prepared or the electronics funds transfer to occur to (i) debit the payor's bank account, (ii) credit the payee's account at a payee's depository bank and (iii) credit the payment amount to the payor's accounts receivable or loan balance forward with the payee, and the machine readable data including at least the payor's account number with the payee, and the machine readable data being readable to allow automatic extraction of data from a data base to enable a preauthorized draft to be automatically printed or an electronics transfer to occur, and the preauthorized draft comprising a document which is printed upon receipt by the payee, a lockbox or a bank and based upon the machine readable data contained on a respective payment coupon, said draft including both human readable information and machine readable data, the human readable information on the draft comprising at least the name of the payee, the name of the payor, the payor's bank account number and payor's account number with the payee, name of the bank, payment amount, information regarding the matter billed, the payment date, and the machine readable data on the draft comprising the payor's bank transit/routing number, the payor's bank account number, the payment amount, and information regarding the matter billed.

7. In a financial data processing system wherein a payment coupon enables automatic preparation of a preauthorized draft that is capable of entering a conventional check clearing network, a payment coupon in the form of a non-negotiable document having printed thereon human readable information and machine readable data, the human readable information including at least the name and bank account number of a payor, the account number of the payor with a payee, a payment amount, an indication for enabling the payor to direct an electronics funds transfer, and an authorization statement signable by the payor to allow the draft to be prepared or the electronics funds transfer to occur to (i) debit the payor's bank account, (ii) credit the payee's account at a payee's depository bank and (iii) credit the payment amount to the payor's accounts receivable or load balance forward with the payee, and the machine readable data including at least the payor's account number with the payee, and the preauthorized draft comprising a document which is printed upon receipt by the payee, a lockbox or a bank and based upon the machine readable data contained on a respective payment coupon, said draft including both human readable information and machine readable data, the human readable information on the draft comprising at least the name of the payee, the name of the payor, the payor's bank account number and payor's account number with the payee, name of the bank, payment amount, information regarding the matter billed, the payment date and the machine readable data on the draft comprising the payor's bank transit/routing number, the payor's bank account number, the payment amount, and information regarding the matter billed.

8. In a system as in claim 7 and including printing means for printing of the payment coupon, systems means for reading the machine readable contents of the payment coupon and extracting such machine readable contents as to allow access to a data base to retrieve and format a preauthorized draft or electronics funds transfer based on the machine readable data from the respective coupon.

9. In a system as in claim 7 wherein the human readable information on the payment coupon includes a reference number, and machine readable data on the payment coupon further includes the payment amount, payor's bank account number, payor's bank transit routing number, and a reference number and such machine readable data to be read and extracted by automated means of the magnetic, optical or bar code reader type to enable extraction of data from a data base to automatically print the preauthorized draft wherein the preauthorized draft includes the reference number in human readable form.

* * * * *